Feb. 15, 1966    E. L. DANCE    3,234,994
CONCENTRATION OF POLYMERS FROM SOLUTIONS BY FLASH VAPORIZATION
Filed April 26, 1963    3 Sheets-Sheet 2

INVENTOR.
ELDRED L. DANCE
BY
ATTORNEY 3,234,994
CONCENTRATION OF POLYMERS FROM SOLUTIONS BY FLASH VAPORIZATION
Eldred L. Dance, Concord, Calif., assignor to The Dow Chemical Company, Midland, Mich., a corporation of Delaware
Filed Apr. 26, 1963, Ser. No. 275,832
15 Claims. (Cl. 159—47)

This invention relates to a method for recovering polymeric material that is dissolved in dilute concentrations in a solvent for the polymeric material. As a particular aspect, the invention relates to a continuous separation of a polyolefin dissolved in dilute concentration in a hydrocarbon solvent for the polyolefin wherein the solvent is vaporized without creating conditions of unstable flow of the polymer solution in the required heat exchanger and without causing excessive degradation of the polymer.

Of the many methods of polymerizing aliphatic and cyclic olefins and other thermoplastic polymer-forming monomers to high molecular weight polymers, several employ a suitable solvent or suspending vehicle for the polymer to assist in the polymerization and subsequent treating and handling operations. Ordinarily, the resulting polymer is concentrated by removal of solvent and/or by reduction of its solvency for the polymer, as by cooling, evaporation of solvent or the like. Thereafter it is handled and transported in slurry form prior to the final separation of polymer solids from the slurry by physical separation means, such as filtration.

It would be of advantage, and it is among the primary concerns of the instant invention, to provide a means whereby, when utilizing solution polymerization, the polymer can be kept in solution or at least in liquid form throughout, that is from the polymerization step to the final polymer recovery. The advantages and related benefits of this type of process are readily apparent to one familiar with the art when account is taken of the costly equipment required for slurry and solids handling, not to mention the additional handling treatments involved. Further, there are obvious advantages from an operational standpoint in avoiding the difficulties encountered with most solids handling equipment compared to liquid systems. For instance, such problems as plugging and general abrasion are encountered in closed solids handling systems, as well as fly ash or air contamination and detrimental effects on bearings and other moving machinery parts in open solids handling systems.

With solution polymerization and handling, as with any other polymer system, the final processing is usually one of recovering or obtaining the finished polymer in one form or another. This recovery can be handled in one of several ways, but in instances wherein dilute polymer solutions are to be processed, the solvent removal becomes significantly less than straight forward. The extreme changes that occur in solution properties with small changes in polymer concentrations create troublesome control problems which are ultimately reflected in the quality of the polymer product. In this connection, one of the more important criticalities of the recovered polymer is the level of residual solvent and other volatiles. This level must necessarily be low to avoid creating serious problems through the tendency of the volatiles to "bleed" to the surface of the normally solid polymer and interfere with subsequent handling, treating and processing, and detracting from aesthetic characteristics such as by imparting a greasy feeling to the surface. Those volatiles that do not bleed to the surface and are entrapped in the polymer mass generate bubbles and imperfections in articles fabricated from the polymer.

As a corollary and attendant problem in separating the solvent from the polymer, which, in most instances, requires heating the solution in one fashion or another, is the thermally induced degradation of the polymer. This degradation is apparently a complex function of both temperature level and temperature level-residence time, as well as the initial molecular weight, the type of polymer and the presence of certain impurities.

One method that may be beneficially employed to separate solvent from polymer is to pass the polymer solution through the tubes of a multiple tube evaporator to vaporize at least a portion of the solvent and then discharge the mixture of polymer solution and vaporized solvent into a receiver from which the vapor is withdrawn. If necessary, this operation can be repeated in several stages until all the solvent is removed. In each subsequent stage a more concentrated polymer solution is thus treated. For economical reasons, and to eliminate prolonged heating of the polymer solutions for reasons indicated in the foregoing, it is desirable and preferable that evaporation of the solvent and recovery of a polymer essentially completely free of volatiles be carried out in as few stages as possible and advantageously in two stages.

It has been found, however, that when this method is utilized to recover polymer from dilute polymer solutions, the polymer product is often non-uniform in composition and frequently unacceptable due to the high level of volatiles remaining in the polymer. This is thought to be caused by the sensitive polymer solution properties, as previously indicated. For instance, solution viscosity exhibits rapid deviation with relatively minor changes in polymer concentration. These properties, in turn, affect heat transfer coefficients in a manner such that the analysis of the results is one of additive complications which induces unstable flow conditions of the polymer solution through the devolatilizer tubes.

This phenomenon of flow instability exhibits itself in "channeling" of the solution through the tubes and in non-uniform heating and devolatilization of portions of the polymer solution. Thus, if flow becomes unstable under design conditions and channeling results, the consequence is that the devolatilizer unit cannot be operated at design capacity and product quality is jeopardized.

A further factor contributing to unstable flow is the tendency of two-phase systems to exhibit "slugging" or surging of the solution through the tubes leading to the same detrimental effects that occur with channeling.

The causes of unstable flow are not fully understood, but in general, unstable flow is quite likely to occur in a multi-passage devolatilizer when a maximum is prevalent in the curve obtained from plotting pressure drop through a single passage or tube versus flow rate through the passage or tube. What happens, then, is that for the same pressure drop different flow rates may be occurring in different tubes.

Analyzed qualitatively, the occurrence of these unpredictable flow rates when devolatilizing relatively dilute polymer solutions might be made more clear by considering what possibly may be happening as flow rate is increased through a single tube. At very low feed rates relatively complete and rapid vaporization of the solvent can occur such that the feed can be assumed to be essentially devolatized polymer, and the pressure drop-flow rate curve approximates that for devolatilized polymer. As the feed rate is increased, less solvent per pound of feed is vaporized with a corresponding decrease in viscosity until the pressure drop-flow rate curve for the feed solution is approached. Thus, it is possible for a transition of flow to occur at intermediate flow rates. When channeling develops a few tubes or passages undoubtedly handle the majority of flow with a consequent increase in the volatile content of the product.

Heretofore, the answer to this perplexing situation has been to operate at relatively low feed rates so that the resulting pressure drop is characteristic of but a single flow rate in the tubes. This is unsatisfactory for obvious reasons among which are the low capacities and unfavorable economics, and the long residence times at high temperatures leading to polymer degradation.

To avoid excessive degradation or molecular weight reduction of the polymer, solvent removal by a series of preheat and flash steps has frequently been proposed. However, while such a series of steps may avoid a higher initial temperature, equivalent degradation may result even with prolonged or greater net time at slightly lower temperatures.

Each stage in such a series of preheat and flash steps involves the use of a preheater, operated under sufficient pressure to prevent any boiling or vapor formation, followed by a pressure reduction through a control valve. For each stage, the enthalpy available for vapor formation is equal to the enthalpy change of the polymer solution corresponding to the difference between preheat temperature and the equilibrium flash temperature.

A change in polymer concentration effected per pass is largely determined by the difference between preheat and flash temperature. The preheat temperature must not be so high as to result in excessive degradation or "cracking" to a lower molecular weight, and the flash temperature must be maintained safely above the temperature at which polymer precipitation will occur. Precipitation of a "solid" polymer phase will result in the formation of a stable foam from which the vapor cannot be separated.

The pressure in the preheater should be high enough to prevent "phasing."

Phase separation or "phasing" in polymer processing denotes a molecular weight fractionation accomplished when a polymer solution is heated, under sufficient pressure to prevent boiling, to a high enough temperature to cause separation into two liquid phases, one of higher and the other of lower polymer concentration than the original solution. This phenomena is associated with the marked decrease in density of a solvent as it is heated near its critical temperature where it becomes more gas-like in nature.

The phasing behavior of a solution of polypropylene in heptane is typical. Consider the experimental results of heating an 8–15 percent by weight solution of polymer in n-heptane under the vapor pressure of the solution so boiling is prevented. At a temperature of 120° to 130° C. the polymer is all in solution. At 130° C. the density of heptane is 0.58. When the temperature is raised to about 225° C. (density of heptane=0.45) a second polymer rich liquid phase appears. When a temperature of about 250° C. is reached (density of heptane=0.39), some 95 to 97% of the polymer is found in the polymer rich liquid phase; the remainder being in the solvent rich liquid phase. Upon separation of the phases by decanation, it is found that a molecular weight fractionation has been effected with the high molecular weight fraction in the polymer rich denser phase.

However, in accordance with the present invention, it has now been found, by the use of an efficient preheater as described herein, that a much higher temperature can be tolerated without excessive "cracking" or degradation of the polymer. Therefore, by thus effecting the preheating in a period of not over about 60 minutes, advantageously no more about 10 minutes and preferably no more than about 2 minutes, it has now been found that excessive degradation or cracking of the polymer can be avoided, and the initial preheat-flash step can be used to effect a concentration of at least 80%, advantageously at least 85% and preferably at least 90%, polymer solution.

Furthermore, it has been found according to this invention that is possible by the efficient and relatively short period of preheating to impart to the solution substantially all the heat required for the entire solvent removal operation except for the last 10–20% which is removed in the final devolatilization step. It has been found possible to effect the required preheating and avoid excessive cracking by using a preheater of the shell and tube type with especially small tubes and with the polymer solution passing through the tubes, or by other equally efficient heat transfer means. By designing the tubes with inner diameters in the range of ⅛ to 1.0 inch, preferably ⅛ to ⅜ inch, or inner widths of ¹⁄₁₆ to ½ inch when square or rectangular tubes are used, or the same range of distance between plates when the liquid is heated by flowing between heated plates, it is possible to effect heat transfer through the solution in sufficient time to avoid prolonged exposure of the solution to the high temperatures in this preheating period.

Accordingly, it has been found possible to effect concentration of polymer solutions having 1–20% by weight of polymer to solutions containing approximately 90% by weight of polymer in the initial preheat and flash stage, and then to substantially complete removal of solvent in the second separation step.

In the accompanying drawings, FIG. 1 is a curve plotted to show the solubility of polypropylene in xylene, the weight percent of polypropylene being plotted against the temperature. This figure shows that the minimum temperature that must be maintained as the polypropylene concentration increases is substantially a straight line function.

FIG. 2 shows two curves, one for xylene and the other for n-octane as solvents, in which the values are plotted for the pre-heat temperature at autogenous pressure or higher, required to give a 90% solids solution at 195° C. versus the weight percent of polymer in the starting solution when the preheated solution is adiabatically flashed to a pressure of 0 p.s.i.g. in the case of xylene and to 4 p.s.i.g. for octane.

Figure 4:
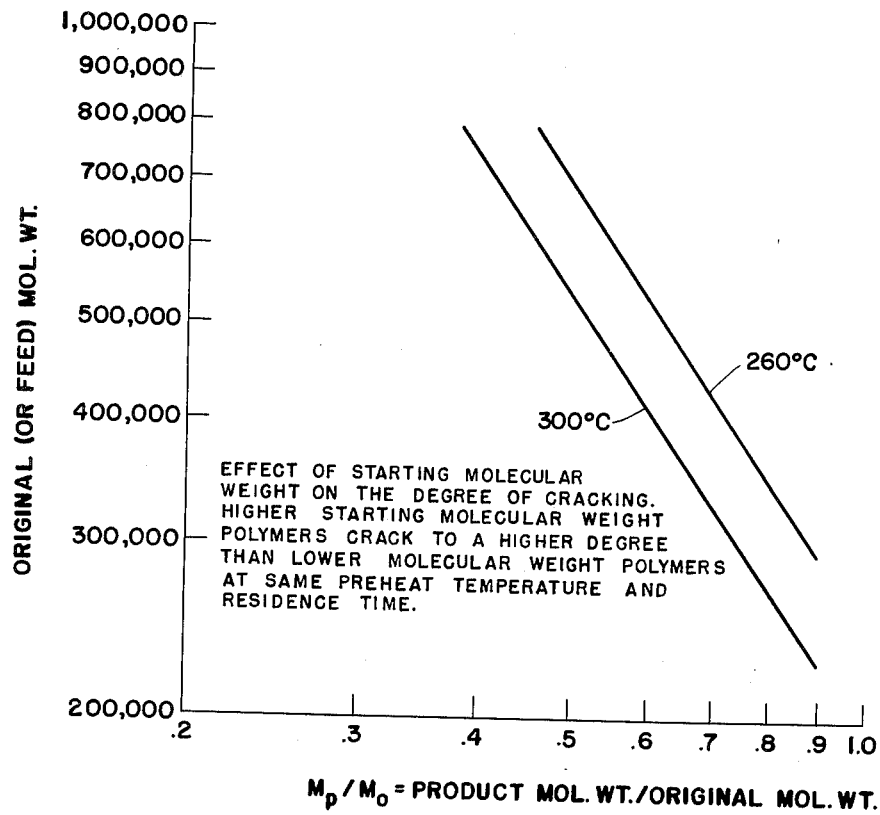
FIG. 4 shows two curves for preheat temperatures of 260° C. (octane solvent) and 300° C. (xylene solvent) respectively plotted on logarithmic scale showing the effect of the starting molecular weight on the ratio of product molecular weight to starting (original or feed) molecular weight for a fixed residence time.

FIG. 4 illustrates the effect of the starting molecular weight on the degree of cracking, the higher starting molecular weight polymer cracking to a higher degree for the same preheat temperature and residence time. From these curves it is possible to estimate satisfactorily the resultant molecular weight of the final product. For example, a polymer having starting molecular weight of 700,000 preheated at 255° C. under these conditions will have an $M_p/M_o$ ratio of approximatetly 0.52. $M_p$ therefore equals $0.52 \times 700,000$ or 364,000. It should be noted that an appreciable portion of the indicated cracking occurs in the latter stage of the process. However, this portion is relatively constant.

Figure 5:
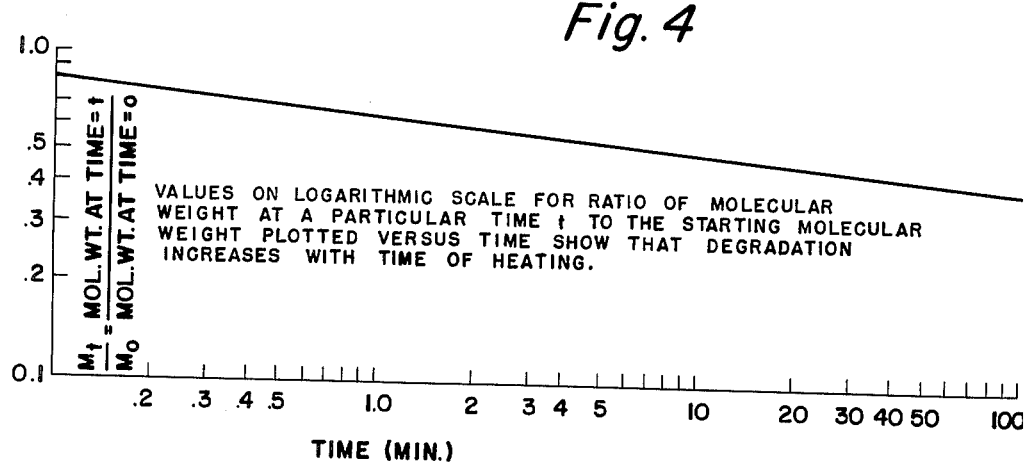

FIG. 5 shows the curve plotted on logarithmic scale for the ratio of the molecular weight of polypropylene at a particular time to the starting molecular weight plotted versus time.

As shown above, the ultimate molecular weight of the product cannot be obtained simply by starting with a higher molecular weight and subtracting a fixed amount for the degradation during the heating period. As shown by the data, the higher the starting molecular weight, the greater is the degree of degradation as the residence time is increased. Therefore the degree of cracking or degradation increases with increased starting molecular weight as well as with increased preheat temperature, and also with increased residence time. Consequently, as shown by the present invention, it is desirable to start with molecular weight sufficiently high above the desired ultimate molecular weight or at least as high as is easily attainable and then by using as low a preheat temperature as possible and as short a residence time as possible control the degree of degradation to a small amount in order to end with the molecular weight desired.

Illustrative of the effect of control of "cracking" accomplished by the short residence time in the preheater is the fact that when a 15% solution of polypropylene in an isoparaffinic solvent is heated from 140° C. to 300° C. in a preheat residence time of about 1.5 minutes, the molecular weight of the polymer is reduced only to about 83% of the starting molecular weight, or 17% degradation. In another case, heating from 140° C. up to 318° C. in 1.5 minutes reduced the molecular weight only to about 75% of the initial molecular weight, or 25% degradation.

The following table indicates the cracking to be expected in the preheat stage when polypropylene of a molecular weight of 500,000 is held therein for the residence times corresponding to different tube diameters.

| O.D. | Tube I.D. (Inch) | Effective Residence Time (Min.) | $M_t/M_o$ | Percent Degradation |
|---|---|---|---|---|
| ¼ | ⅛ | 1.7 | .61 | 39 |
| ⅜ | ¼ | 5.6 | .54 | 46 |
| ½ | ⅜ | 10.0 | .51 | 49 |
| ¾ | ⅝ | 25.2 | .46 | 54 |
| 1.0 | ⅞ | 51.0 | .43 | 57 |

Figure 1:
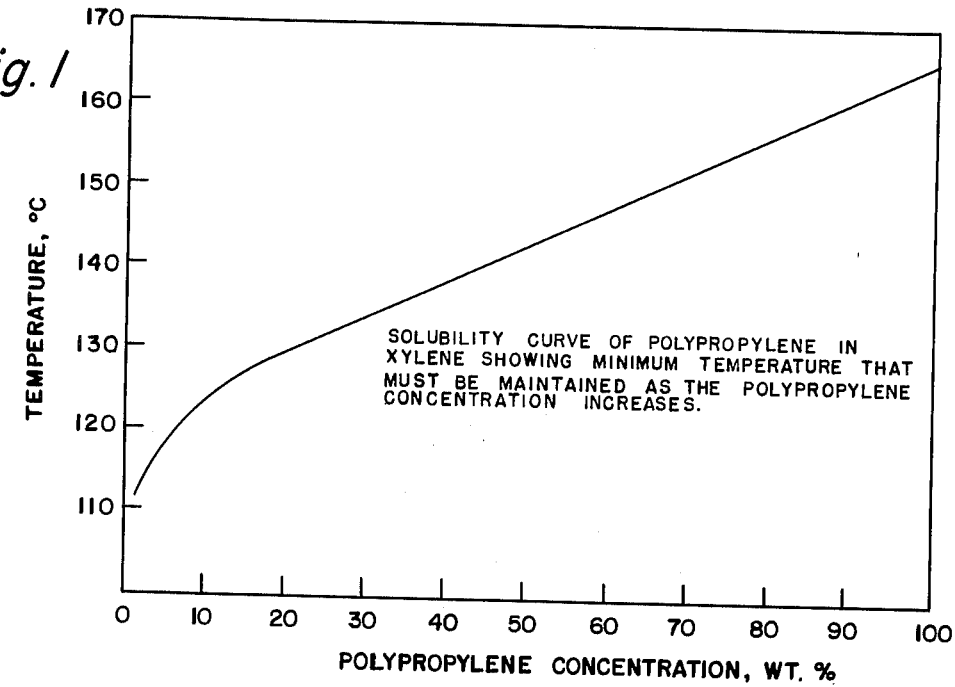
Figure 2:
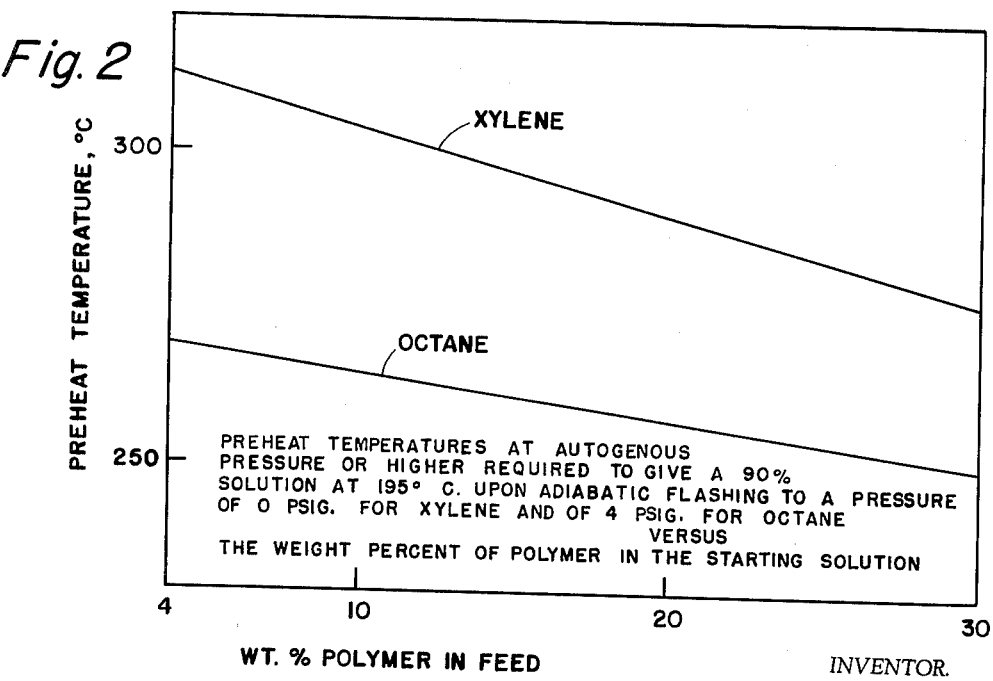

To minimize the required preheat temperature, particularly for solutions of relatively low polymer content, it is advantageous to select a solvent having a low ratio of latent heat to specific heat. Since the heat of vaporization varies for different compounds, it is necessary, when starting with identical concentrations of polymer in the various solvents, that the preheat temperature be varied accordingly in order to obtain equivalent concentrations in the solution resulting from the flash distillation. For example, there is a marked difference in this respect between paraffinic and aromatic hydrocarbons. The curves plotted in FIG. 2 show that for varying starting concentrations of polymer, the preheat temperature required to flash in one stage to 90% by weight concentration of polymer at 195° C. is much higher with xylene as the solvent as compared with the corresponding solutions using n-octane as the solvent. Thus for a 10% solution of polypropylene in m-xylene, a preheat temperature of 304° C. is required as compared to a preheat requirement of only 265° C for 10% solution in n-octane. These values vary only slightly for closely related aromatic and paraffinic compounds.

In the design and operation of a preheater for use with a given solvent, the operating conditions are selected so that "phasing" does not occur as described above.

The following table shows the critical temperatures of several common solvents and approximate phasing temperatures of polypropylene in solution under autogenous pressure.

TABLE I

| Solvent | Critical Temp., ° C. | Phasing Temp., ° C. | Phasing Density, gm./cc. |
|---|---|---|---|
| n-Heptane | 267 | 225 | 0.45 |
| n-Octane | 276 | [1] 253 | [1] 0.45 |
| A commercial paraffin solvent [2] | | [1] 254 | [1] 0.45 |
| Toluene | 321 | [1] 317 | [1] 0.39 |
| m-Xylene | 346 | [1] 342 | [1] 0.39 |

[1] Estimated.
[2] Having a boiling range of 121-139° C. and having as its major components 17% 2,3,4-trimethyl pentane; 22% 2,3,3-trimethyl pentane; and 26% 3-methyl heptane; which octanes have critical temperatures of 295° C., 303° C. and 292° C., respectively.

While phase separation can be prevented simply by keeping the temperature below the phasing temperature at the autogenous pressure, it is also possible to avoid "phasing" as the critical temperature is approached by increasing the pressure in the preheater sufficiently above the autogenous pressure to keep a sufficiently high solvent density.

While it is generally preferred in the practice of this invention to remove as much solvent as possible in the preliminary flash step so as to decrease the amount of solvent which needs to be removed in the final solvent removal step, it may sometimes be desirable to remove only sufficient solvent to give a polymer solution having as little as 80% polymer therein. Generally, however, it is preferred to have solutions concentrated to about 90% polymer so that only 10% solvent needs to be removed in the final separation which is then advantageously effected by fractionation under reduced pressure.

In removing solvent by flash distillation, it is desirable to retain sufficient solvent and to maintain a sufficiently high temperature in order to avoid having the polymer precipitated and to give the solution a sufficiently low viscosity that it can be manipulated through the equipment to the final heat exchanger and final devolatilizer. For these reasons it is generally preferred not to effect concentration of more than about 92 or 93% by initial preheat-flash step. A concentration of about 90% polymer is generally preferred for the final operation.

The final devolatilization step can be performed according to techniques presently used for recovering polypropylene from 90% solutions provided conditions are such as not to cause more degradation than can be tolerated in the ultimate product.

Figure 3:
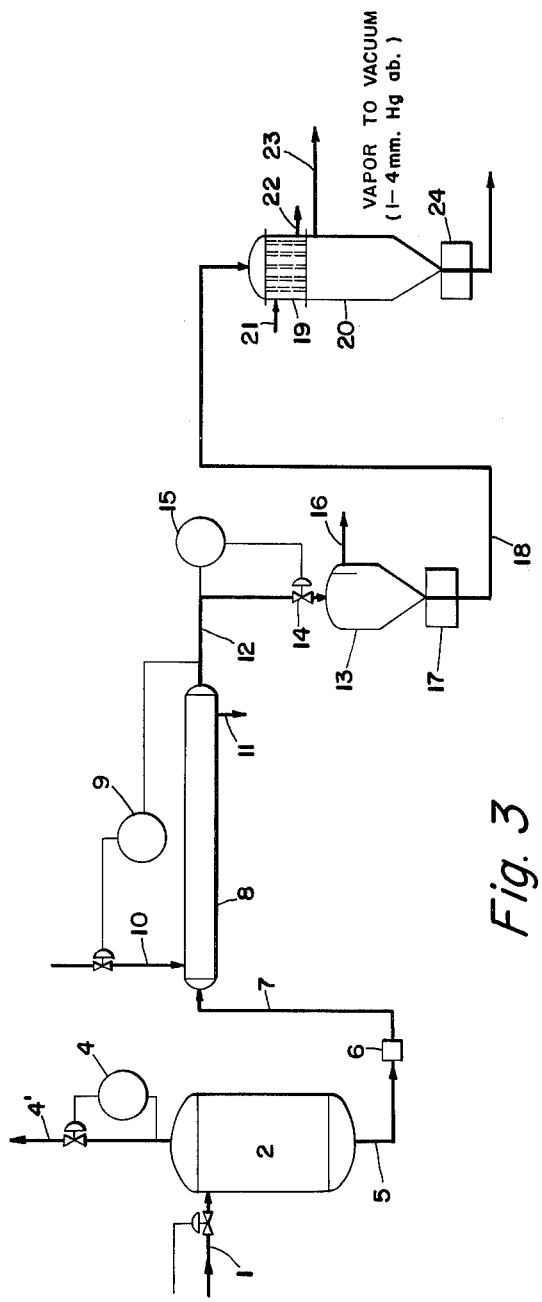
FIG. 3 is a flow sheet of equipment used in the process of this invention involving the preliminary preheat-flash step described herein. This is discussed in detail hereinafter.

The process of this invention is best illustrated by the following examples each of which comprises a description of a method of operation as related to the equipment of FIG. 3. The scope of the invention and manner in which it can be practiced are not to be limited by this description which is intended to be merely illustrative. Unless specified otherwise, here and throughout the specification, parts and percentages are by weight.

*Example I*

Polypropylene solution of approximately 12.5% by weight is fed through inlet line 1 into surge tank 2 which is maintained at about 2.3 p.s.i.g. and is equipped with a pressure control 4 and pressure outlet 4'. The solution passes out liquid outlet 5 through pump 6 which delivers the solution through line 7 into first stage preheater 8. Pump 6 is a metering type pump and delivers the solution to the first stage preheater 8 at a pressure of 400 p.s.i.g. The solution is heated in the preheater 8 to 301° C. by means of Dowtherm A vapor which condenses at 320° C. This preheater 8 is of the shell and tube type with the solution to be heated passing through the tubes which in this case number 1,225 tubes, have ¼ inch O.D. (³⁄₁₆ inch I.D.) and are 22 gauge and 20 feet long.

Approximately 12,800 pounds per hour of the 12.5% solution of polypropylene in xylene is delivered at a temperature of 144° C. into the preheater. The total average residence time in the preheater is about 1.3 minutes. This preheater is equipped with a temperature control device 9 and Dowtherm A inlet 10 and outlet 11. The preheated solution is passed from the preheater through line 12 into flash tank 13 which is maintained at approximately one atmosphere pressure. Valve 14 is activated by pressure control 15 in such a manner that the pressure in line 12 is at approximately 380 p.s.i.g. The solution is concentrated in flash tank 13 to approximately 90% by weight of polymer at a temperature of 195° C. The volatilized solvent is removed from flash tank 13 by outlet 16. The concentrated solution is then pumped by a gear or viscosity screw pump 17 through line 18 into the heat exchanging portion 19 of second stage devolatilizer 20. This heat exchanger can be of standard types, because the polymer-to-solvent ratio in the concentrated solution is so high that the large change in viscosity experienced with more dilute solutions does not occur and hence flow instability does not result. The heat exchanger portion 19 in this case is also a tube and shell type in which the solution passes through the tubes which are heated by Dowtherm A passing into inlet 21 and out outlet 22. The tubes in this heat exchanger consist of 800 tubes ¾" O.D. (⅝" I.D.) gauge and 3 feet long. This exchanger allows formation in the tubes of vapor which exits into a vacuum receiver (not shown) connected to vapor outlet line 23. The vacuum receiver is maintained at a reduced pressure of about 1–2 mm. Hg absolute pressure. The polymer product is removed through the lower end of the devolatilizer 20 by means of gear or screw viscosity pump 24 at a temperature of about 240° C. This product is mixed with stabilizers and additives, and extruded into a water bath to form solid strands which are cut into pellets. The volatile content of the product is 0.1% by weight.

The volatilization in the second stage devolatilizer is effected preferably by ordinary vaporization since flash vaporization with such high concentration of polymer sometimes results in foaming.

As expected and as is ordinarily the case, the reduction in molecular weight of the polymer is appreciable in this step. However, this additional reduction in molecular weight can now be accommodated since the molecular weight reduction in the first (preheating) stage gives much less than in prior processes.

It might be considered that an ultimate molecular weight can be attained by determining the degree of degradation which will be effected by a particular set of conditions and, by starting with a polymer having an appropriately high molecular weight, thereby to produce an ultimate polymer having the desired molecular weight. However, as pointed out above, the degree of degradation increases with higher molecular weights of the starting polymer. Therefore this technique is not as simple as it appears and it is necessary to keep the degree of degradation as low as possible and also in a predictable and reproducible range. This is possible with the present invention.

Therefore, by having the amount of degradation under control to a predictable and reproducible degree it is possible to make a product of desired molecular weight by starting with a higher molecular polymer and effecting the separation by the simplified procedure of this invention with only an appropriate and moderate degree of degradation. In a typical run, starting with a molecular weight of about 350,000, the process described above effects a reduction in molecular weight to 280,000 in the polymer passing out of the first stage preheater, and to a final product of 180,000, e.g. after the second stage devolatilizer. In this operation a throughput of 1,600 pounds of polypropylene per hour is accommodated. The corresponding throughput for xylene is 11,200 pounds per hour through the first stage preheater, approximately 11,022 pounds per hour of this passing through the vapor outlet of the first stage tank and approximately 178 pounds per hour passing out of the first stage flash tank with the polymer. Substantially all of this is removed from the polymer in the second stage devolatilizer.

The second stage devolatilization can also be conducted in flash unit but since about the same size equipment is thus required there is no particular advantage in using a flash system for this stage.

In the first stage flash vaporization, concentration to about 90% by weight of polymer is preferred. While other concentrations are operable within the practice of this invention, e.g. as low as 80%, lower concentrations increase the load on the vacuum system of the second stage and higher concentrations require a higher preheat temperature in the first stage with corresponding increase in degradation.

The use of the simple stage preheater-flash vaporization of this invention to get the solution to a high concentration, e.g. at least 80% preferably about 90%, in the initial preheat-flash step has the added advantage that the preheating is done with solutions of relatively low concentration and hence low viscosity during the heating period which permits faster heat transfer. Moreover, the lower viscosity permits the passage of the solution through passages of small diameter or close clearances which is desirable so that heat conductance through the solution is through the shortest possible distance. This permits more efficient and more uniform heat transfer, and thereby avoids the excessive degradation in molecular weight to which the polymer is exposed when less efficient heat transfer means and/or longer residence periods are used in the preheating stage or stages.

*Example II*

The procedure of Example I is repeated with the following changes. In place of the xylene, a commercial paraffinic solvent is used which comprises predominantly octanes and has a boiling range of 121°–139° C., the major components being approximately 17% 2,3,4-trimethyl pentane; 22% 2,3,3-trimethyl pentane; and 26% 3-methyl heptane. The polypropylene is fed at a rate of 195 pounds per hour in the form of an 11.8% solution in the solvent described above. This solution is delivered at a temperature of 140° C. to the first stage preheater at a pressure of 700 p.s.i.g. In the first stage preheater the solution is heated to 285° C. by means of Dowtherm A vapor maintained at about 297° C. The preheater is a shell and tube type with the polymer solution passing through the tubes. There are 85 tubes, 20 gauge, ¼" O.D. and 12 feet in length. The total average residence time in the preheater is about 1.5 minutes. The heated solution is then flashed through the pressure reduction valve into the flash tank maintained at 4 p.s.i.g. The resulting polymer solution has a concentration of 91.4% solids. This solution is passed into a second stage devolatilizer of the type described in Example I operating at an effluent temperature of 245° C. with a reduced pressure in the receiver of about 1 mm. Hg absolute. The resulting polymer contains less than 0.1% by weight of volatile matter. Under these conditions, a polymer having a starting molecular weight of 334,000 going to the first preheater, is reduced in molecular weight at the first stage receiver to 230,000 and in the final product to a molecular weight of 200,000.

*Example III*

The process of Example I is repeated except that the second step of solvent removal is effected by preheating the concentrated solution from the initial flash distillation step, to a temperature of 250° C. within 20 minutes, and immediately thereafter flashing into a chamber maintained at a reduced pressure of approximately 1–2 mm. Hg absolute pressure. The resultant effluent temperature is 240° C. The lower outlet of this flash chamber is equipped with a screw pump for forcing the viscous polymer from the chamber. Similar results are obtained as in Example II.

*Example IV*

The procedure of Example II is repeated except that the second step of solvent removal is effected by preheating the concentrated solution from the initial flash distillation step, to a temperature of 250° C. within 20 minutes, and immediately thereafter flashed into a chamber maintained at a pressure of approximately 1–2 mm. Hg absolute pressure. The resultant effluent temperature is 240° C. The lower outlet of this flash chamber is equipped with a screw pump for forcing the viscous polymer from the chamber. Similar results are obtained as in Example II.

*Example V*

The procedures of Examples I–IV are repeated with good results using polybutene-1 in one series, and a propylene-butene-1 copolymer in another series respectively as the polymer instead of polypropylene.

*Example VI*

In the equipment of FIG. 3, a 10.7 wt. percent solution of polyethylene in an octane solvent (boiling range 121–139° C.) at a temperature of 140° C. is pumped at a rate of 107 lbs./hr. by a metering type pump to the preheater at a pressure of 660 p.s.i.g. and heated to 255° C. by means of Dowtherm "A" vapor at about 265° C. The preheater is a shell and tube type with the polymer solution in the tubes and consists of 85, ¼″ O.D., 20 gauge tubes, 12 feet in length. The total average residence time in the preheater is about 2.7 minutes.

The heated solution is flashed through a pressure reduction valve into a receiver maintained at 6 p.s.i.g. The resulting polymer solution has a concentration of 90% solids. This polymer is forwarded to the second stage devolatilizer operating at 246° C. with a receiver pressure of about 2 mm. Hg absolute. The resulting polymer contains less than 0.1% volatiles by weight. There is no molecular weight change during the processing and both the initial molecular weight to the preheater and the final product molecular weight are 40,000.

The process of this invention is particularly applicable to solutions having no more than about 20% polypropylene therein. With such solutions, the temperature of preheating in the first stage is advantageously in the range of 255–315° C. When xylene or closely related aromatic solvents are used, this preheat temperature is advantageously in the range of 290–315° C. When paraffinic solvents in the $C_8$ boiling range are used, this preheat temperature can advantageously be in the range of 255°–270° C.

In the first stage preheating, a residence time of no more than about 60 minutes is advantageous, preferably no more than about 10 minutes. For xylene this residence time is preferably no more than about 5 minutes, and for octanes, this time is preferably no more than about 10 minutes.

In the first stage flash distillation, the pressure of the flash chamber is advantageously maintained at about atmospheric pressure. However, reduced pressures can also be used provided they do not result in such a lowering of the temperature of the resultant concentrated solution that the precipitation point is reached. This may be desirable with higher boiling solvents, such as xylene.

The present inventive process is applicable for treating and recovering any thermoplastic polymer from dilute solutions (suspensions or slurries) of the polymer wherein the solvent has a significantly lower boiling point than the polymer. For example, polystyrene in benzene, polyvinyl chloride in trichloroethylene, etc. are also profitably treated in accordance with the invention. Advantageously, and beneficially, dilute polymer solutions of a polymerized aliphatic or cyclic olefin, including both mono- and di- olefins, such as ethylene, propylene, butylene, and butadiene (including polymerizable mixtures thereof) and particularly 1-olefins, which are so designated because of their terminally unsaturated configuration, preferably ethylene, propylene, butene-1 and copolymers thereof containing a major portion of such monomer are treated in accordance with the invention.

In a preferred embodiment of the invention, solutions are treated containing the polyolefin polymers prepared by polymerization of monoolefinic aliphatic olefin monomers, such as ethylene, propylene, butylene and so forth (including polymerizable mixtures thereof) that contain from 2 to about 8 carbon atoms. These polymers of ethylene, propylene and other non-aromatic hydrocarbon olefins may be obtained under relatively low pressures of 1 to 100 atmospheres using such catalysts for polymerizing the ethylene or other olefin as mixtures of strong reducing agents and compounds of Group IV–B, V–B and VI–B metals of the Periodic System; chromium oxide on silicated alumina; hexavalent molybdenum compounds; and charcoal supported nickel-cobalt; etc.

These polymer solutions are frequently obtained by polymerizing the monoolefins in an inert solvent, preferably a hydrocarbon solvent, which may suitably be a 3 to 12 carbon atom paraffinic or aromatic hydrocarbon solvent, such as hexane, cyclohexane and advantageously benzene, toluene and xylene. The polymerization reactor effluent will usually contain polymer, solvent, unreacted monomer and suspended catalyst. A normal sequence of processing may entail flashing off unreacted monomer followed by filtering out catalyst which leaves a solution of polymer in solvent. This solution, then, is preferentially treated according to the herein described invention to recover the polymer. However, it is to be understood that the invention is applicable to recovering polymer from relatively dilute polymer solutions regardless of the source of the solution.

Polymer solutions containing from about 0.5 to 50 weight percent polymer solids are advantageously treated in accordance with the invention. Ordinarily, the problems of unstable flow are not encountered or at least are not as prevalent and detrimental in polymer solutions having concentrations of about 50 percent or more polymer dissolved therein. However, the present treatment can be employed and is effective for recovering polymer from any solution concentration. As indicated, solutions of polyolefins from polymerized monoolefins are beneficially treated according to the instant invention. These solutions when polymerized as hereinbefore described usually contain from about 0.5 to 30 or so weight percent, frequently from about 5 to 20 and advantageously about 7 to 11 weight percent dissolved polymer solids. Thus, dilute polymer solutions in these later mentioned concentration ranges are preferably treated by the present method for recovery of essentially volatile-free polymer.

The temperature and pressure as which the preheater and the devolatilizer are operated and the temperature and pressure of the polymer solution after flashing will depend on the concentration of polymer in the solution feed, and the particular polymer and solvent of the solution. These conditions can readily be determined by analyzing one of several characteristics such as product quality, extreme pressure fluctuations in the devolatilizer, and the shape of the flow rate-pressure drop curve.

Generally, the upper temperature limit throughout the processing is controlled by the polymer stability, that is, the temperature at which substantial polymer degradation or decomposition will occur. The lower temperature limit is controlled by the vaporization temperature of the solvent at the particular pressures involved, the temperature at which the polymer is no longer soluble in the solvent and the melting point of the polymer involved. It is desirable that the temperature be maintained above the polymer melting point.

When treating the indicated dilute polymer solutions of a polymerized monoolefinic aliphatic olefin monomer that contains from 2 to about 8 carbon atoms, the solution is advantageously heated in the preheater 8 to about 235° to 350° C., preferably 255° to 310° C., and at least autogenous pressure within 60 minutes, preferably less than 10 minutes, and flashed to a pressure of about atmospheric pressure.

With a second stage devolatilizer of a distillation type, the heater portion is maintained at a temperature between 190° C. at the inlet and 200–290° C. at the outlet with a pressure of 1–4 mm. Hg absolute maintained in the receiver zone thereof. With a second stage a devolatilizer of the flash type, the solution is heated to a temperature of 210–290° C. and flashed into a space maintained at no more than 4 mm. Hg absolute pressure.

As indicated, the invention is applicable to recovering polymer from suspensions and slurries when temperatures above the melting point of the polymer are employed. Although true "solutions" may not be involved (due to possible phasing and the like) a liquid mass results which, for the purposes at hand, may be referred to as a solution.

While certain features of this invention have been described in detail with respect to various embodiments thereof, it will, of course, be apparent that other modifications can be made within the spirit and scope of this invention and it is not intended to limit the invention to the details shown above except insofar as they are defined in the following claims.

The invention claimed is:

1. In a process for concentrating a thermoplastic polymer from a solution thereof having no more than 50 percent by weight of said polymer therein, the improvement comprising the steps of
    (a) rapidly preheating the solution to a temperature of at least 235° C. and no greater than 350° C. within a period of no more than 60 minutes and under a pressure of at least the autogenous pressure, and
    (b) immediately thereafter releasing said heated solution into a flash chamber maintained at approximately atmospheric pressure by withdrawal of vaporized solvent therefrom, whereby a concentrated solution of at least 80 percent by weight of said polymer is obtained.

2. The process of claim 1 in which said concentrated polymer solution is thereafter passed through a heating zone having the pressure at the exit end thereof maintained at an absolute pressure of 1–4 mm. of Hg and having a temperature sufficient to impart to said polymer a temperature of 200–290° C. and to vaporize substantially the solvent in said solution; passing the vapor-liquid mixture exiting from said heating zone into a receiving zone maintained at a pressure of 1–4 mm. Hg absolute by withdrawal of vaporized solvent therefrom; and withdrawing from said receiving zone said polymer in molten form essentially free of said solvent.

3. The process of claim 1 in which the resultant concentrated solution from step (b) is reheated to a temperature of at least 210° C. and no greater than 290° C. within a heating period of no more than 60 minutes under at least the autogenous pressure and immediately thereafter said heated solution is flash distilled by release into a flash chamber maintained at a pressure of no more than approximately 4 mm. Hg absolute.

4. The process of claim 1, in which the solvent in said solution is xylene and said preheat temperature is in the range of 290° to 310° C.

5. The process of claim 1, in which the solvent in said solution is a close boiling mixture of paraffins in the $C_8$ boiling range and said preheat temperature is in the range of 255° to 270° C.

6. The process of claim 1 in which said preheating is effected in a period of no more than 10 minutes.

7. The process of claim 1 in which said polymer contains at least a major portion of a monomer selected from the class consisting of ethylene, propylene and butene-1.

8. The process of claim 1 in which said concentrated polymer solution is thereafter passed through a heating zone having the pressure at the exit end thereof maintained at an absolute pressure of 1–4 mm. of Hg and having a temperature sufficient to impart to said polymer a temperature of 200–290° C. and to vaporize substantially the solvent in said solution; passing the vapor-liquid mixture exiting from said heating zone into a receiving zone maintained at a pressure of 1–4 mm. Hg absolute by withdrawal of vaporized solvent therefrom; and withdrawing from said receiving zone said polymer in molten form essentially free of said solvent.

9. The process of claim 1 in which the resultant concentrated solution from step (b) is reheated to a temperature of at least 210° C. and no greater than 290° C. within a heating period of no more than 60 minutes under at least the autogenous pressure and immediately thereafter said heated solution is flash distilled by release into a flash chamber maintained at a pressure of no more than approximately 4 mm. Hg absolute.

10. In a process for recovering polypropylene from a xylene solution thereof containing no more than approximately 15 percent polypropylene, the improvement comprising the steps of
    (a) rapidly preheating said solution to a temperature of approximately 310° C. within a period of no more than 60 minues under at least the autogenous pressure;
    (b) immediately thereafter releasing said heated solution into a flash chamber maintained at approximately atmospheric pressure, whereby a concentrated solution of at least 85 percent polypropylene is obtained;
    (c) passing said concentrated solution through a heating zone having the pressure at the exit end thereof maintained at an absolute pressure of 1–4 mm. Hg and thereby heating said polymer to a temperature of 230–250° C. and vaporizing substantially the solvent in said solution;
    (d) passing the liquid-vapor mixture exiting from said heating zone into a receiving zone maintained at a pressure of 1–4 mm. Hg absolute by withdrawal of vaporized solvent therefrom; and
    (e) withdrawing from said receiving zone said polymer in molten form essentially free of said solvent.

11. The process of claim 10 in which said preheating is effected in a period of no more than 10 minutes.

12. In a process for recovering polypropylene from a xylene solution thereof containing no more than about 15 percent polypropylene therein, the improvement comprising the steps of
    (a) rapidly preheating said solution to a temperature of approximately 310° C. within a period of no more than 60 minutes under at least the autogenous pressure;
    (b) immediately thereafter releasing said heated solution into a flash chamber maintained at approximately atmospheric pressure, whereby a concentrated solution of at least approximately 85 percent polypropylene is obtained;
    (c) thereafter heating the resultant concentrated solution to a temperature of approximately 250° C. within a heating period of 60 minutes; and
    (d) immediately thereafter flash distilling said heated solution by releasing it into a flash chamber maintained at a pressure of approximately no more than 4 mm. Hg absolute.

13. The process of claim 12 in which said preheating (a) is effected in a period of no more than 10 minutes.

14. In a process for recovering polypropylene containing no more than about 20 percent polypropylene in a paraffinic hydrocarbon solvent boiling in the $C_8$ boiling range, the improvement comprising the steps of
    (a) rapidly preheating said solution to a temperature of approximately 265° C. within a period of approximately 60 minutes under at least the autogenous pressure;
    (b) immediately thereafter releasing said heated solution into a flash chamber maintained at approximately atmospheric pressure, whereby a concentrated solution of at least 85 percent polypropylene is obtained;
    (c) passing said concentrated solution through a heating zone having the pressure at the exit end thereof maintained at an absolute pressure of 1–4 mm. Hg and having a temperature therein sufficient to impart to said polymer a temperature of 230–250° C. and to vaporize substantially the solvent in said solution;

(d) passing the liquid-vapor mixture exiting from said heating zone into a receiving zone maintained at a pressure of 1–4 mm. Hg absolute by withdrawal of vaporized solvent therefrom; and
(e) withdrawing from said receiving zone said polymer in molten form essentially free of said solvent.

15. In a process for recovering polypropylene containing no more than about 20 percent polypropylene in a paraffinic hydrocarbon solvent boiling in the $C_8$ boiling range, the improvement comprising the steps of
(a) rapidly preheating said solution to a temperature of approximately 265° C. within a period of approximately 60 minutes under at least the autogenous pressure;
(b) immediately thereafter releasing said heated solution into a flash chamber maintained at approximately atmospheric pressure whereby a concentrated solution of at least 85 percent polypropylene is obtained;
(c) thereafter heating the resultant concentrated solution to a temperature of approximately 250° C. within a heating period of 60 minutes; and
(d) immediately thereafter flash distilling said heated solution by releasing it into a flash chamber maintained at a pressure of no more than approximately 4 mm. Hg. absolute.

References Cited by the Examiner
UNITED STATES PATENTS

| | | | |
|---|---|---|---|
| 1,735,980 | 11/1929 | Sadtler | 159—27 X |
| 2,267,133 | 12/1941 | Porter | 159—47 X |
| 2,943,082 | 6/1960 | Cottle | 260—94.95 X |
| 3,073,380 | 1/1963 | Palmason | |
| 3,081,290 | 3/1963 | Cottle | 260—93.7 X |

NORMAN YUDKOFF, *Primary Examiner.*